US012681149B2

(12) United States Patent
    Kudo et al.

(10) Patent No.: US 12,681,149 B2
(45) Date of Patent: Jul. 14, 2026

(54) FORWARD MONITORING SYSTEM

(71) Applicant: Hitachi, Ltd., Tokyo (JP)

(72) Inventors: Takumi Kudo, Tokyo (JP); Yukihiko Ono, Tokyo (JP); Jun Koike, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 17/926,469

(22) PCT Filed: Apr. 23, 2021

(86) PCT No.: PCT/JP2021/016496
    § 371 (c)(1),
    (2) Date: Nov. 18, 2022

(87) PCT Pub. No.: WO2021/235175
    PCT Pub. Date: Nov. 25, 2021

(65) Prior Publication Data
    US 2023/0184896 A1     Jun. 15, 2023

(30) Foreign Application Priority Data
    May 22, 2020     (JP) ................................. 2020-089960

(51) Int. Cl.
    *G01S 7/481*     (2006.01)
    *B61L 23/00*     (2006.01)
    (Continued)

(52) U.S. Cl.
    CPC ........... *G01S 7/4813* (2013.01); *B61L 23/00* (2013.01); *B61L 23/041* (2013.01); *G01S 7/023* (2013.01);
    (Continued)

(58) Field of Classification Search
    CPC ...... G01S 7/4813; G01S 17/931; G01S 7/023; G01S 7/292; G01S 7/354; G01S 7/40;
    (Continued)

(56) References Cited

U.S. PATENT DOCUMENTS

2003/0098786 A1     5/2003  Bishop
2005/0201096 A1 *   9/2005  Terui ..................... G01S 7/4812
                                                          362/276
(Continued)

FOREIGN PATENT DOCUMENTS

DE     10 2012 025 464 A1     7/2014
DE        102012212150 B4 *   2/2023  ........... G01S 7/4813
(Continued)

OTHER PUBLICATIONS

English machine translation of JP2015212705A (Year: 2015).*
(Continued)

*Primary Examiner* — Dominic J Bologna
(74) *Attorney, Agent, or Firm* — Crowell & Moring LLP

(57)     ABSTRACT

As a front monitoring system of a vehicle with strict restrictions on device arrangement, in a case where one or a plurality of external sensors are installed, an exit wave emitted from the external sensors and reflected by a structural object inside the vehicle is prevented from re-entering the external sensor, and erroneous detection of an object is suppressed. As a front monitoring system therefor, an external sensor that is mounted inside a vehicle, emits an exit wave toward a front of the vehicle, and acquires a reflected wave entering the external sensor as a detection signal, and a removing means that removes the exit wave emitted by the external sensor and incident on a structural object installed inside the vehicle in a specific direction, particularly at an incident angle larger than a predetermined angle are provided.

8 Claims, 14 Drawing Sheets

(51) Int. Cl.

| | |
|---|---|
| *B61L 23/04* | (2006.01) |
| *G01S 7/02* | (2006.01) |
| *G01S 7/292* | (2006.01) |
| *G01S 7/35* | (2006.01) |
| *G01S 7/40* | (2006.01) |
| *G01S 7/48* | (2006.01) |
| *G01S 7/487* | (2006.01) |
| *G01S 7/497* | (2006.01) |
| *G01S 13/931* | (2020.01) |
| *G01S 17/931* | (2020.01) |
| *G08G 1/16* | (2006.01) |

(52) U.S. Cl.
  CPC .............. *G01S 7/292* (2013.01); *G01S 7/354* (2013.01); *G01S 7/40* (2013.01); *G01S 7/4808* (2013.01); *G01S 7/4811* (2013.01); *G01S 7/487* (2013.01); *G01S 7/497* (2013.01); *G01S 13/931* (2013.01); *G01S 17/931* (2020.01); *G08G 1/16* (2013.01); *G01S 2013/93271* (2020.01)

(58) Field of Classification Search
  CPC ......... G01S 2013/93271; G01S 7/4808; G01S 7/4811; G01S 7/487; G01S 7/497; G01S 13/931; B61L 23/00; B61L 23/041; G08G 1/16
  See application file for complete search history.

(56) References Cited

U.S. PATENT DOCUMENTS

| | | | |
|---|---|---|---|
| 2012/0187283 A1 | 7/2012 | Yamada et al. | |
| 2013/0088379 A1* | 4/2013 | Ohkado | G01S 13/345 342/123 |
| 2016/0274220 A1* | 9/2016 | Autran | G01S 7/4814 |
| 2016/0291134 A1 | 10/2016 | Droz et al. | |
| 2018/0203110 A1* | 7/2018 | Watanabe | G01S 7/027 |
| 2019/0072652 A1 | 3/2019 | Morikawa et al. | |
| 2019/0346538 A1 | 11/2019 | Masuda et al. | |
| 2020/0064452 A1 | 2/2020 | Avlas et al. | |
| 2020/0139939 A1* | 5/2020 | Kubota | B08B 3/04 |

FOREIGN PATENT DOCUMENTS

| | | | |
|---|---|---|---|
| JP | 2002-156442 A | | 5/2002 |
| JP | 2005-257324 A | | 9/2005 |
| JP | 2012-154806 A | | 8/2012 |
| JP | 2013-36976 A | | 2/2013 |
| JP | 2014-181993 A | | 9/2014 |
| JP | 2015212705 A | * | 11/2015 |
| JP | 2016-166790 A | | 9/2016 |
| JP | 2016-534355 A | | 11/2016 |
| JP | 2018-511056 A | | 4/2018 |
| JP | 2018-112528 A | | 7/2018 |
| JP | 2019-45288 A | | 3/2019 |
| WO | WO 2018/124206 A1 | | 7/2018 |

OTHER PUBLICATIONS

English machine translation of DE102012212150B4 (Year: 2012).*
Extended European Search Report issued in European Application No. 21808953.0 dated Nov. 27, 2024 (21 pages).
Japanese-language Office Action issued in Japanese Application No. 2020-089960 dated Nov. 7, 2023, with English translation (7 pages).
International Search Report (PCT/ISA/210) issued in PCT Application No. PCT/JP2021/016496 dated Jul. 6, 2021 with English translation (nine (9) pages).
Japanese-language Written Opinion (PCT/ISA/237) issued in PCT Application No. PCT/JP2021/016496 dated Jul. 6, 2021 (six (6) pages).
Partial Supplementary European Search Report issued in European Application No. 21808953.0 dated Aug. 6, 2024 (19 pages).

* cited by examiner

A-A CROSS-SECTIONAL VIEW 517

B-B CROSS-SECTIONAL VIEW 518

FORWARD MONITORING SYSTEM

TECHNICAL FIELD

The present invention relates to a front monitoring system related to traffic.

BACKGROUND ART

In a railway driverless system and a railway driving support system, a system that avoids a collision between a train and an object by monitoring the front of the train and detecting the object that may hinder the traveling of the train is indispensable. In the case of a train, remote monitoring of the front of the train is required for reasons such as a long braking distance, but near monitoring of the periphery of the train is also required to avoid collision with an object at the periphery of the train at the time of starting the train or the like.

As a near monitoring means at the periphery of the train, it is effective to use LiDAR that detects an object by scanning a wide area with a laser and performing laser ranging. In a case where LiDAR is mounted on a train, installation on an existing train is assumed. If the LiDAR is installed outside the vehicle, there is a concern that the lifespan of the LiDAR is shortened due to environmental factors such as rain and wind, and the reliability of the train front monitoring system using the LiDAR is lowered. Therefore, the LiDAR used for front monitoring has a high possibility of being installed inside the train.

When the LiDAR is installed in a train, there is a possibility that a laser emitted by the LiDAR is reflected by an in-vehicle structural object or the like and re-enters the own LiDAR. Furthermore, a system in which a plurality of LiDARs are installed to secure a wide field of view is considered, but in the case of such a system, there is still a possibility that a laser emitted from a certain LiDAR is reflected by an in-vehicle structural object or the like and enters another LiDAR.

Due to the laser that is reflected by the in-vehicle structural object or the like and incident on the LiDAR, a point group that does not originally exist appears in the data of point group acquired by the LiDAR. Since front monitoring and object detection are performed from the acquired point group, there is a risk that erroneous detection of an object occurs due to such a point group that does not originally exist.

Since the train mounted with the front monitoring system performs the brake operation determination based on the detection result of the object, an erroneous brake command is sent if the object is erroneously detected, which may lead to a decrease in the transportation efficiency of the train. Therefore, the laser reflected by the in-vehicle structural object needs to be removed as it causes erroneous detection of an object.

Therefore, PTL 1 proposes a method of preventing erroneous detection of an object due to the installation of a plurality of LiDARs by installing a division structure between a plurality of LiDARs having different wavelengths and causing only a laser light having a specific wavelength to enter the LiDAR by an optical filter so that no other LiDAR laser enters.

In addition, PTL 2 proposes a technique in which an optical filter is mounted inside a LiDAR to limit a range of an incident angle of a laser with respect to a laser light receiving portion and exclude a laser outside the range as stray light after grasping an incident direction of the laser when a laser emitted from the LiDAR is reflected in a surrounding environment and normally incident on the LiDAR. Thus, among the lasers emitted by the LiDAR, only the laser reflected by an object other than the LiDAR is collected, and stray light is excluded.

CITATION LIST

Patent Literature

PTL 1: JP 2018-511056 A
PTL 2: JP 2012-154806 A

SUMMARY OF INVENTION

Technical Problem

In the method described in PTL 1, a plurality of LiDARs need to be arranged in spaces completely separated by a division structure, and thus it is not easy to implement it on a train in which restrictions in the arrangement of devices installed in the vehicle is strict. In addition, it is difficult to prevent a phenomenon that erroneous detection occurs when a laser that it has emitted is reflected by an in-vehicle structural object and entered to the LiDAR again.

Furthermore, in the method described in PTL 2, a direction of a laser normally entering a light receiving portion in the LiDAR is grasped in advance, and a stray light laser that enters at an angle different from the laser is removed by an optical filter. However, when another laser emitted by a LiDAR different from a specific LiDAR is reflected by the in-vehicle structural object, there is a possibility that the laser may enter the light receiving portion at an incident angle similar to that of the specific laser, and thus it is difficult to remove the laser as stray light by the optical filter.

Furthermore, since the method described in PTL 2 is based on a LiDAR incorporating a special optical filter, it is difficult to use the method described in PTL 2 for a LiDAR not mounted with this optical filter.

As described above, in a case where an external sensor using one or a plurality of reflected waves by, for example, LIDAR is installed on a train in which restrictions in the arrangement of the devices are restrict, a phenomenon in which an unintended point group coexists in the point group data acquired by the external sensor occurs due to the exit wave emitted by the external sensor being reflected by the in-vehicle structural object and then incident on the external sensor.

An object of the present invention is to provide a front monitoring system that prevents this phenomenon caused by an external sensor, thereby suppressing erroneous detection caused by this phenomenon.

Solution to Problem

In order to solve such a problem, a front monitoring system according to the present invention includes an external sensor that is mounted inside a vehicle, emits an exit wave toward a front of the vehicle, and acquires a reflected wave entering the external sensor detection signal, and includes a removing means that removes the exit wave emitted by the external sensor and incident on a structural object installed inside the vehicle in a specific direction, particularly at an incident angle larger than a predetermined angle.

Advantageous Effects of Invention

According to the present invention, in a case where one or a plurality of external sensors is installed in a vehicle with strict device arrangement restrictions, it is possible to prevent a phenomenon in which an unintended point group coexist in point group data acquired by the external sensor due to an exit wave emitted by the external sensor being reflected by a structural object installed inside the vehicle and then incident on the external sensor itself. As a result, erroneous detection caused by such a phenomenon can be significantly suppressed.

DESCRIPTION OF EMBODIMENTS

Hereinafter, embodiments will be described as modes for implementing the present invention with reference to the drawings. In addition, the following embodiments are examples embodying the present invention, and are not intended to limit the technical scope of the present invention.

In describing each embodiment according to the present invention, an outline of a method for removing an unnecessary exit wave for preventing erroneous detection will be described in common in each embodiment.

Figure 1:
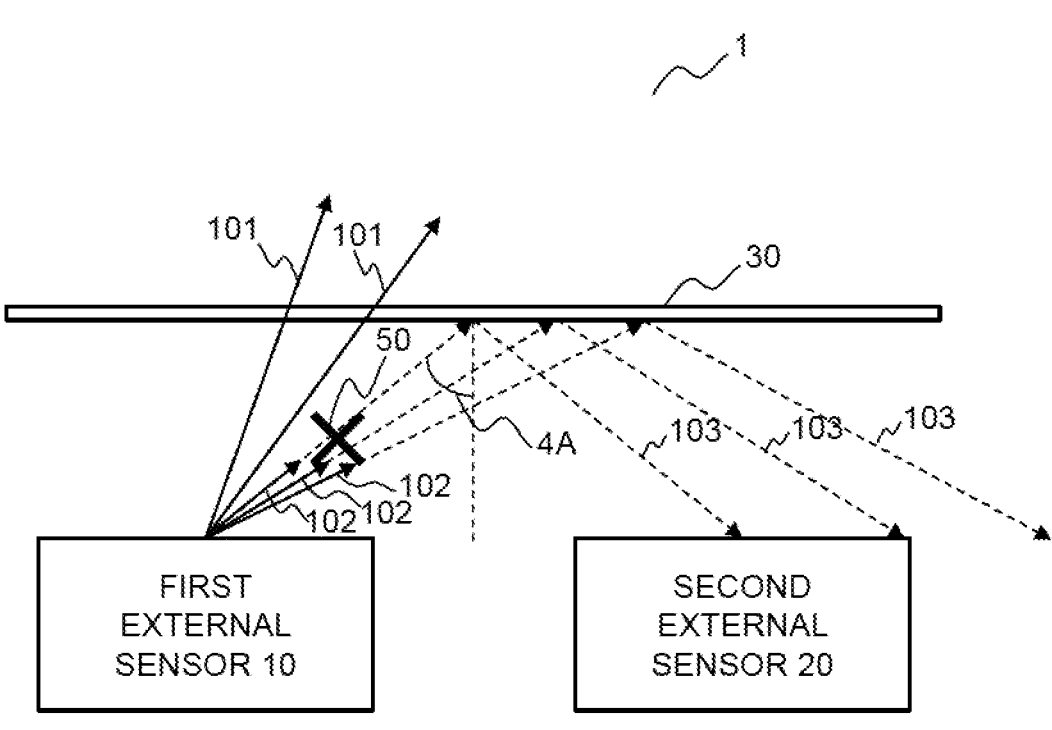
FIG. 1 is a diagram illustrating an outline of a means for removing reflected exit wave according to the present invention.

FIG. 1 is a diagram illustrating an outline of a means for removing a reflected exit wave according to the present invention, and illustrates an outline of a means 50 for removing an exit wave emitted by a first external sensor 10 and reflected by an in-vehicle structural object 30.

The exit wave emitted from the first external sensor 10 is divided into an exit wave 101 that is transmitted and an exit wave 102 that is not transmitted but reflected with respect to the in-vehicle structural object 30.

Here, the first external sensor 10 is a sensor that performs distance measurement using a reflected wave. For example, there are LiDAR for detecting an object by scanning a wide area with a laser and performing laser ranging, millimeter wave radar for detecting a surrounding object by emitting a radio wave in a millimeter wave band, and the like.

The exit wave to be used is a wave emitted from the first external sensor 10 and used for distance measurement. For example, there are laser light and radio waves in a millimeter wave band.

The in-vehicle structural object 30 is a structural object constituting the interior of the vehicle. Examples thereof include, for example, a windshield and a metallic wall surface. The exit wave 102 reflected by in-vehicle structural object 30 advances along optical path 103. Furthermore, examples of the vehicle include, for example, a railway vehicle and an automobile.

Since the exit wave 102 that becomes a reflected wave is reflected by the in-vehicle structural object 30 and incident on the first external sensor 10 again, there is a possibility that a point group that does not originally exist is acquired from the exit wave 102.

Furthermore, in a case where the second external sensor 20 is installed, there is a possibility that the exit wave 102 enters the second external sensor 20, and a point group that does not originally exist is acquired from the exit wave 102. The second external sensor 20 is a sensor that performs distance measurement using a reflected wave, similarly to the first external sensor 10. For example, there are LiDAR that emits a plurality of lasers to measure the surrounding distance, millimeter wave radar that emits radio waves in a millimeter wave band to detect surrounding objects, and the like.

Therefore, in order not to acquire a point group that does not originally exist, it is necessary to prevent the exit wave 102 from entering the first external sensor 10 or the second external sensor 20.

As means for this, a method of physically blocking the exit wave 102 by inserting a plate or the like to block the optical path 103 of the exit wave 102, or a method of analyzing the point group data acquired by the second external sensor 20 and removing the point group derived from the exit wave 102 by software processing can be considered.

Hereinafter, a method of physically blocking and a method of removing by software processing will be described with the embodiments.

First Embodiment

A first embodiment is an example of a method of physically blocking the reflected unnecessary exit wave 102.

Figure 2:
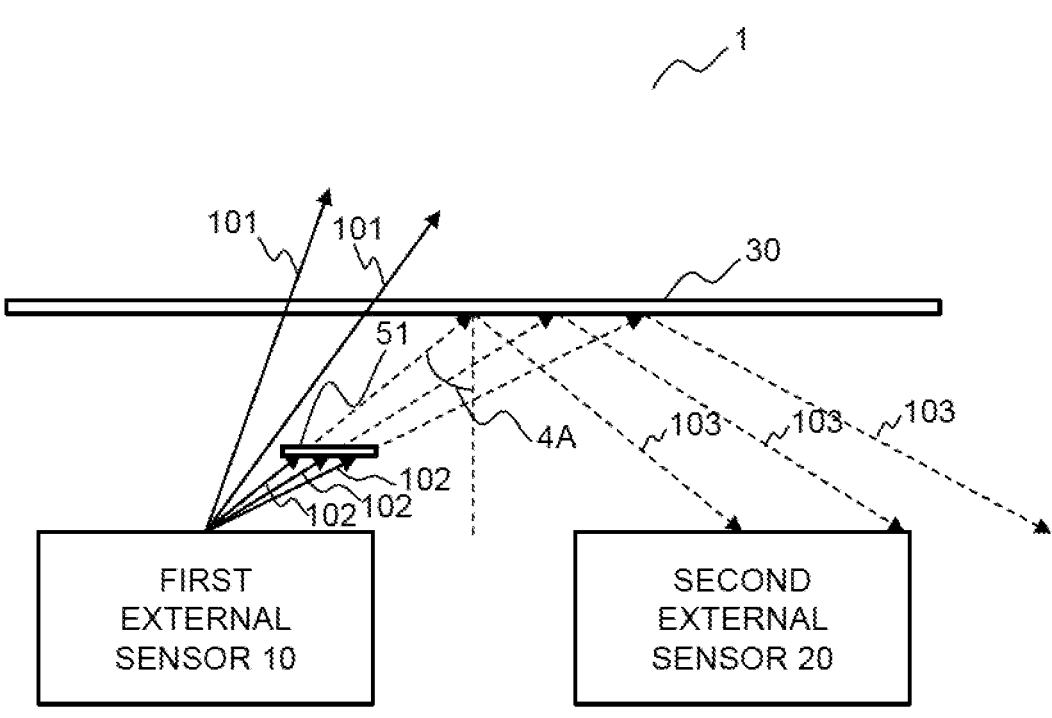
FIG. 2 is a diagram illustrating an example of a configuration of a front monitoring system according to a first embodiment.

FIG. 2 is a diagram illustrating an example of a configuration of a front monitoring system according to the first embodiment. This is an example in which a plate 51 having a low reflectance is installed on the front surface side of the first external sensor 10 in order to block the exit wave 102 reflected by the in-vehicle structural object 30 of the exit wave emitted by the first external sensor 10.

In FIG. 2, the exit wave in a case where the incident angle to the in-vehicle structural object 30 is larger than or equal to a predetermined angle 4A of the exit wave emitted by the first external sensor 10 is regarded as the exit wave 102 reflected by the in-vehicle structural object 30. For example, when the in-vehicle structural object 30 is a windshield, the predetermined angle 4A may be a critical angle in a phenomenon where total reflection occurs at a boundary surface between the windshield and the outside air without passing through the windshield.

In this manner, the exit wave having an incident angle with respect to the in-vehicle structural object 30 of larger than or equal to the predetermined angle 4A is blocked by the plate 51 using the predetermined angle 4A. As a result, the exit wave 102 reflected without being transmitted through the in-vehicle structural object 30 can be blocked, and the exit wave 102 can be prevented from entering the first external sensor 10 or the second external sensor 20 while maximally using the exit wave 101 transmitted through the in-vehicle object 30 useful for front monitoring, Therefore, in front monitoring, erroneous detection caused by acquiring a point group that is derived from the exit wave 102 and does not originally exist can be reduced. Note that the incident angle is an angle formed by the incident direction and the normal line of the boundary surface.

Next, an example of the arrangement, shape, and dimension of the plate 51 for blocking the exit wave 102 will be specifically described with reference to FIGS. 3, 4, and 5.

Figure 3:
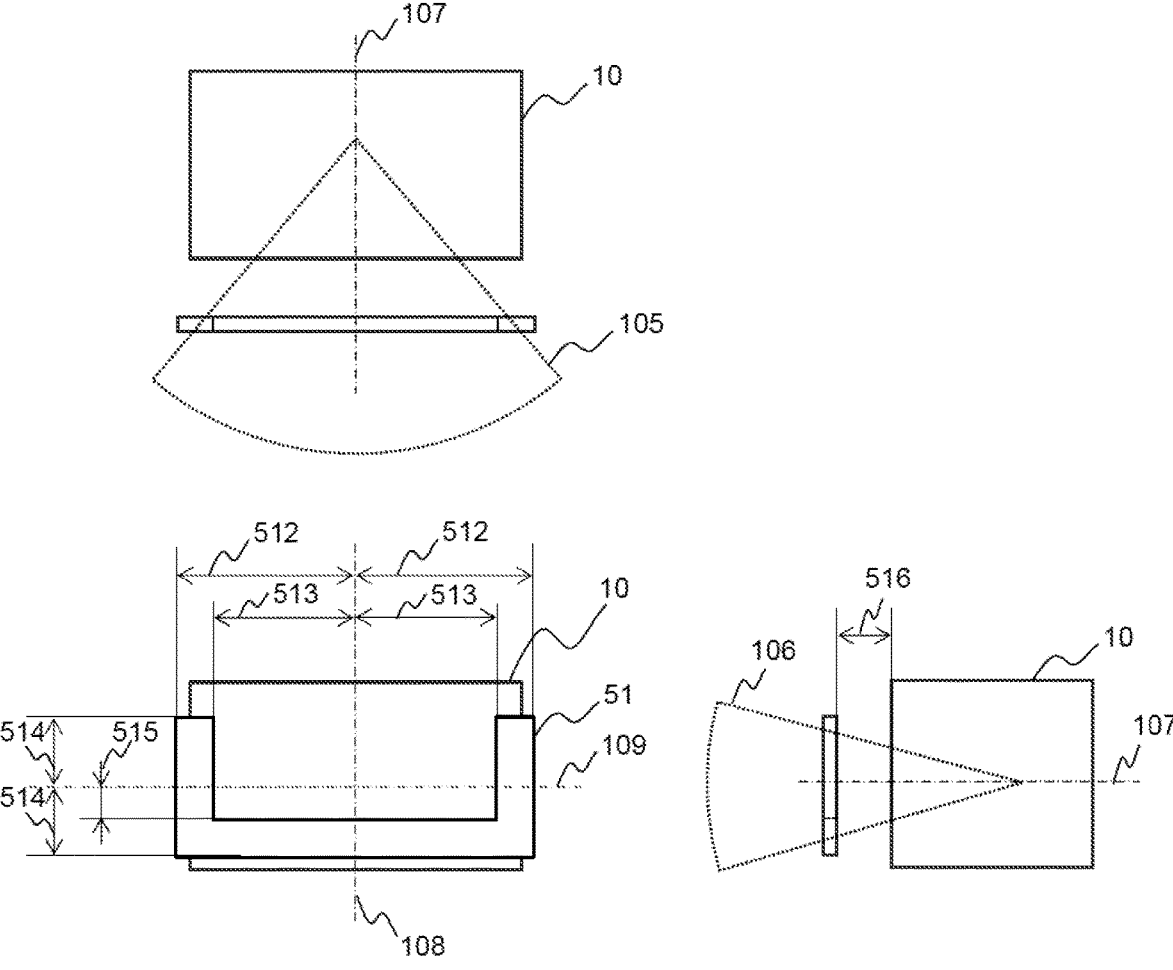
FIG. 3 is a three-view diagram illustrating an arrangement relationship between a first external sensor and a plate.

FIG. 3 is a trihedral figure illustrating an arrangement relationship between the first external sensor 10 and the plate 51, and illustrates an arrangement of the plate 51 installed on the front surface of the first external sensor 10 and a dimension of the plate 51. Here, FIG. 3 is illustrated by a third angle system.

In FIG. 3, reference numeral 105 denotes a horizontal field of view (FoV) (hereinafter, "horizontal FoV" is referred to as a "horizontal viewing angle") of the first external sensor 10, and reference numeral 106 denotes a vertical field of view (FoV) (hereinafter, referred to as a "vertical viewing angle") of the first external sensor 10. A center line 107 is a straight line in which a fan shape representing the horizontal viewing angle (105) and a fan shape representing the vertical viewing angle (106) intersect, and the other center lines 108 and 109 are straight lines perpendicular to the center line 107.

The condition that the dimension of the plate 51 should satisfy to block the exit wave 102 is determined by the distance 516 between the first external sensor 10 and the plate 51, the horizontal viewing angle (105), the vertical viewing angle (106), the refractive index of the in-vehicle structural object 30, and the positional relationship between the in-vehicle structural object 30 and the first external sensor 10. Here, the dimension of the plate 51 is defined by the distance with the center line 108 and the center line 109, and as illustrated in FIG. 3, is the distance 512, the distance 513, the distance 514, and the distance 515.

Hereinafter, an example of a method of calculating a condition that the dimension from the distance 512 to the distance 515 should satisfy will be described with reference to FIGS. 4 and 5.

Figure 4:
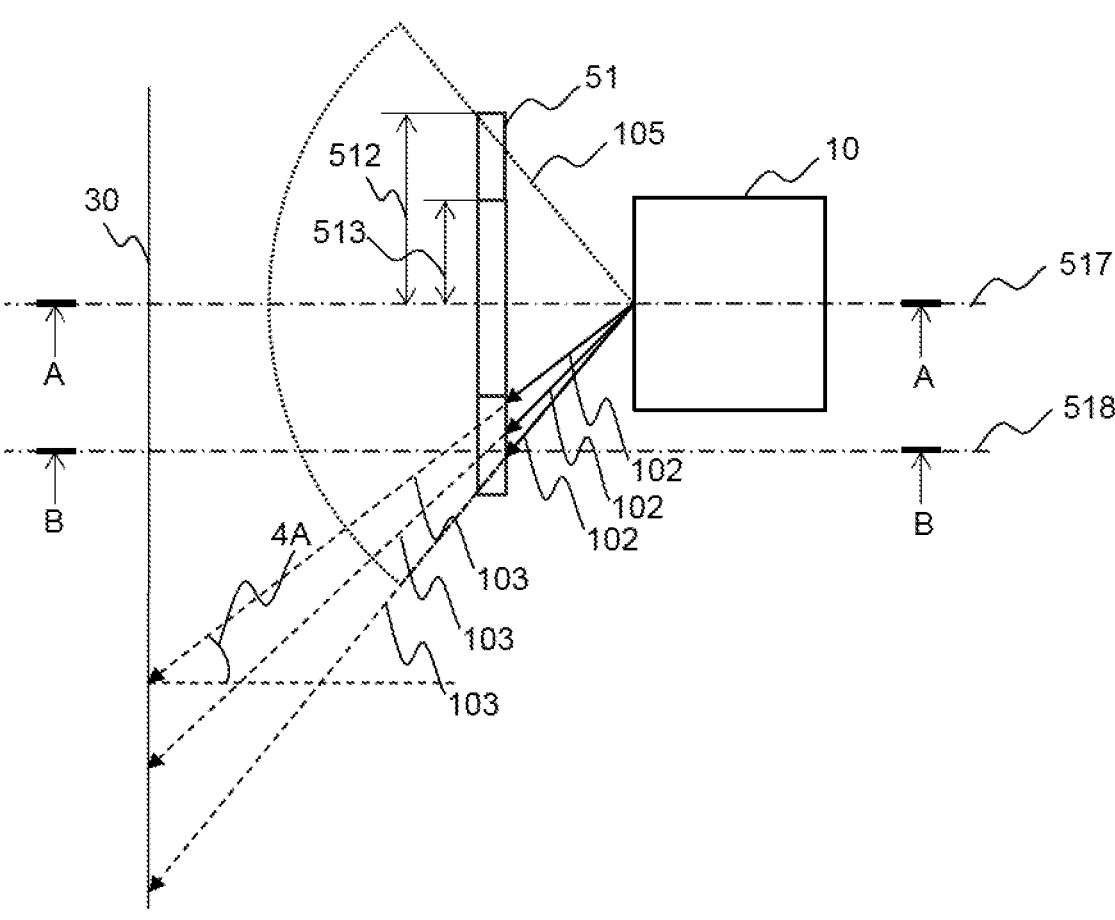
FIG. 4 is a top view illustrating a positional relationship of the first external sensor, an in-vehicle structural object, and the plate.

FIG. 4 is a top view illustrating a positional relationship of the first external sensor 10, the in-vehicle structural object 30, and the plate 51, where a fan shape constituting the horizontal viewing angle (105) is parallel to the plane of drawing. Hereinafter, dimensional conditions (distance 512 to distance 515) of the plate 51 for excluding an exit wave having an incident angle with respect to the in-vehicle structural object 30 of larger than or equal to the predetermined angle 4A from the exit wave 102 emitted by the first external sensor 10 will be described.

However, for the sake of generalization, the in-vehicle structural object 30 is assumed to be inclined at a certain angle and not parallel to the plate 51. As illustrated in FIG. 5, an angle formed by the in-vehicle structural object 30 and a plane 301 parallel to the horizontal viewing angle (105) is 4B. Thus, by setting the angle 4B, the first embodiment can also be applied to a vehicle in which the angle 4B takes a value other than 90°, such as a railway vehicle or a passenger car.

Figure 5:
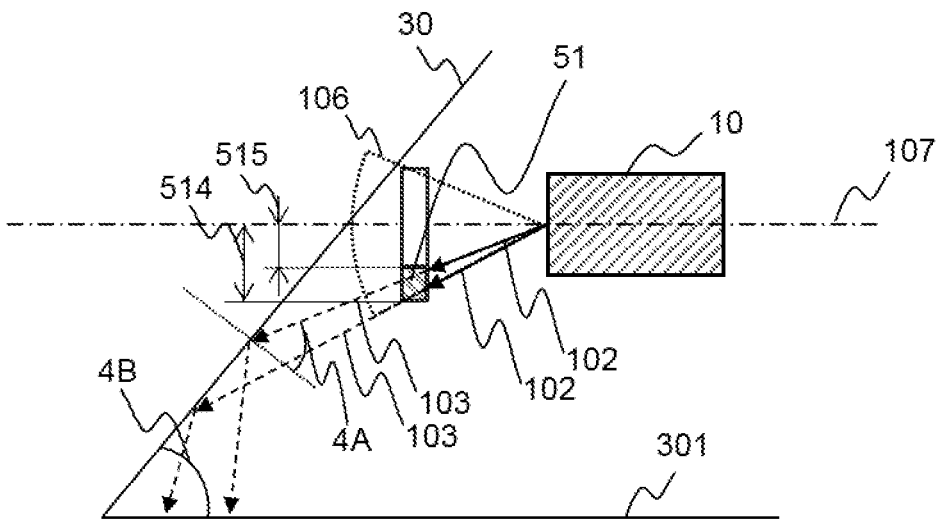
FIG. 5 is a side view illustrating a positional relationship of the first external sensor, the in-vehicle structural object, and the plate in two cross sections.
Figure 5:
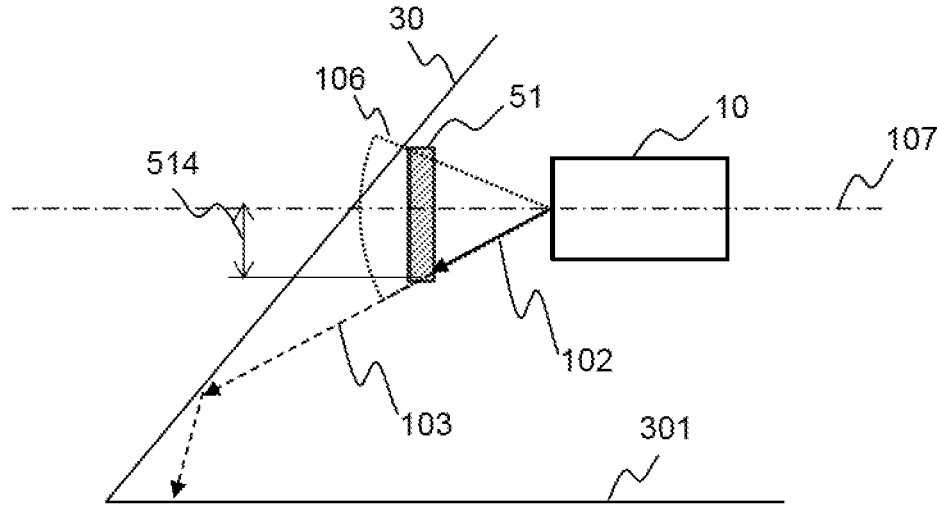

In order to obtain the dimensional condition from the distance 512 to the distance 515, an A-A cross-sectional view 517 and a B-B cross-sectional view 518 illustrated in FIG. 5 are used in addition to FIG. 4. FIG. 5 is a side view (A-A cross-sectional view 517 and B-B cross-sectional view 518) illustrating a positional relationship of the first external sensor 10, the in-vehicle structural object 30, and the plate 51 in two cross sections.

First, the A-A cross-sectional view 517 is a cross-sectional view of the incident angle of the exit wave 102 emitted from the first external sensor 10 with respect to the in-vehicle structural object 30 within a range in which the incident angle in the horizontal direction is smaller than the predetermined angle 4A (FIG. 4) when a plane parallel to the horizontal viewing angle (105) is assumed as a horizontal plane.

As illustrated in FIG. 4, the distance 513 in the horizontal direction is set to a value that satisfies, of the exit wave 102 emitted from the first external sensor 10, not blocking the exit wave having an incident angle with respect to the in-vehicle structural object 30 of smaller than the predetermined angle 4A, and blocking the exit wave having an incident angle of larger than or equal to the predetermined angle 4A.

In the A-A cross-sectional view 517 illustrated in FIG. 5, when a plane parallel to the vertical viewing angle (106) is assumed as a vertical plane, there is a possibility that the incident angle in the vertical direction becomes larger than or equal to the predetermined angle 4A as in an exit wave 102 in the A-A cross-sectional view 517.

Therefore, the distance 515 in the vertical direction is a value that satisfies, of the exit wave 102 emitted from the first external sensor 10, not blocking the exit wave 102 having an incident angle in the A-A cross-sectional view 517 of smaller than the predetermined angle 4A, and blocking the exit wave 102 having an incident angle in the A-A cross-sectional view 517 of larger than or equal to the predetermined angle 4A. Furthermore, distance 514 in the vertical direction is set to a value that satisfies blocking of all exit waves 102 having an incident angle in the A-A cross-sectional view 517 of larger than or equal to the predetermined angle 4A.

Next, the B-B cross-sectional view 518 is a cross-sectional view of the incident angle of the exit wave 102 emitted from the first external sensor 10 with respect to the in-vehicle structural object 30 within a range in which the incident angle in the horizontal direction is larger than or equal to the predetermined angle 4A (FIG. 4) when a plane parallel to the horizontal viewing angle (105) is assumed as a horizontal plane.

As illustrated in FIG. 4, the distance 512 in the horizontal direction is set to a value that satisfies blocking of all exit waves having incident angles with respect to the in-vehicle structural object 30 of larger than or equal to the predetermined angle 4A of the exit waves 102 emitted from the first external sensor 10.

In the B-B cross-sectional view 518 illustrated in FIG. 5, all of the exit waves 102 emitted from the first external sensor 10 are reflected by the in-vehicle structural object 30. Therefore, the distance 514 in the vertical direction is set to a value that satisfies blocking of all exit waves 102 in the B-B cross-sectional view 518.

The plate 51 having the dimension determined by the above method is installed between the first external sensor 10 and the in-vehicle structural object 30. As a result, among the exit waves 102 emitted by the first external sensor 10, the exit wave 102 reflected by the in-vehicle structural object 30 can be removed while maximally using the exit wave 101 transmitted through the in-vehicle structural object 30, and erroneous detection of the external sensor from the exit wave 102 can be reduced. Note that the same applies to a case where the relationship between the emission and incidence of the first external sensor 10 and the second external sensor 20 is reversed, and the plate 51 is arranged on the front surface side of the second external sensor 20.

Second Embodiment

A second embodiment is another example of a method of physically blocking the reflected unnecessary exit wave 102. However, the second embodiment is a method of providing a margin in the arrangement of the plate used at the time of physical blocking by imposing some restrictions on the arrangement of the first external sensor 10 and the second external sensor 20.

Figure 6:
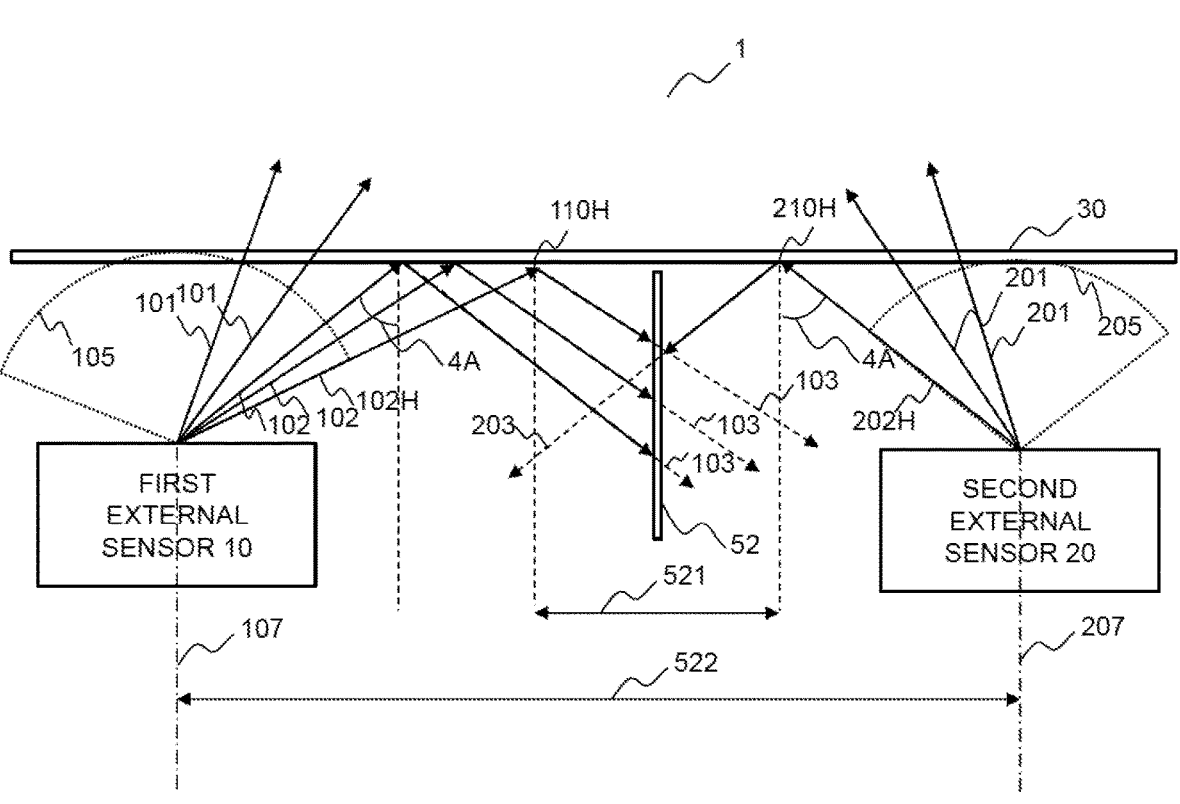
FIG. 6 is a diagram illustrating an example of a configuration of a front monitoring system according to a second embodiment.

FIG. 6 is a diagram illustrating an example of the configuration of the front monitoring system according to the second embodiment, and illustrates the arrangement of the first external sensor 10, the second external sensor 20, and the plate 52 for blocking the exit wave 102 reflected by the in-vehicle structural object 30.

The center line 207 is a straight line in which a fan shape representing the horizontal viewing angle (205) of the second external sensor 20 and a fan shape representing the vertical viewing angle (206, not shown) intersect.

In the second embodiment, the distance between the center line 107 and the center line 207 is defined as a distance 522, and the plate 52 is assumed to be on a plane parallel to the vertical viewing angle (106, not shown) of the first external sensor 10.

Furthermore, as illustrated in FIG. 6, among the exit waves emitted from the first external sensor 10, a point where the exit wave 102 H having the largest incident angle with respect to the in-vehicle structural object 30 collides with the in-vehicle object 30 and is closer to the second external sensor 20 is defined as a first reflection point 110H. Similarly, among the exit waves emitted from the second external sensor 20, a point where the exit wave 202 H having the largest incident angle with respect to the in-vehicle structural object 30 collides with the in-vehicle structural object 30 and is closer to the first external sensor 10 is defined as a second reflection point 210H. A distance between the first reflection point 110H and the second reflection point 210H is defined as a distance 521.

At this time, the first external sensor 10, the first reflection point 110H, the plate 52, the second reflection point 210H, and the second external sensor 20 are lined in this order, and the distance 522 is set such that the distance 521 is a value larger than 0. Then, as long as the dimension of the plate 52 is set to block all of the exit waves 102 emitted from the first external sensor 10, reflected by the in-vehicle structural object 30, and incident on the second external sensor 20 and the exit waves 202 emitted from the second external sensor 20, reflected by the in-vehicle structural object 30, and incident on the first external sensor 10, the plate 52 may be placed anywhere within the section of the distance 521.

If the distance between the first external sensor 10 and the second external sensor 20 can be appropriately set by the above method, it becomes possible to remove only the exit wave reflected by the in-vehicle structural object 30 without strictly determining the dimension and arrangement of the plate 52. As a result, the dimension and positioning cost can be reduced while having the same performance as in the first embodiment other than the arrangement of the external sensors.

Third Embodiment

A third embodiment is an example of a method of removing an exit wave emitted from the first external sensor 10 and reflected by the in-vehicle structural object 30 by software processing without physically shielding the exit wave with a plate or the like.

Figure 7:
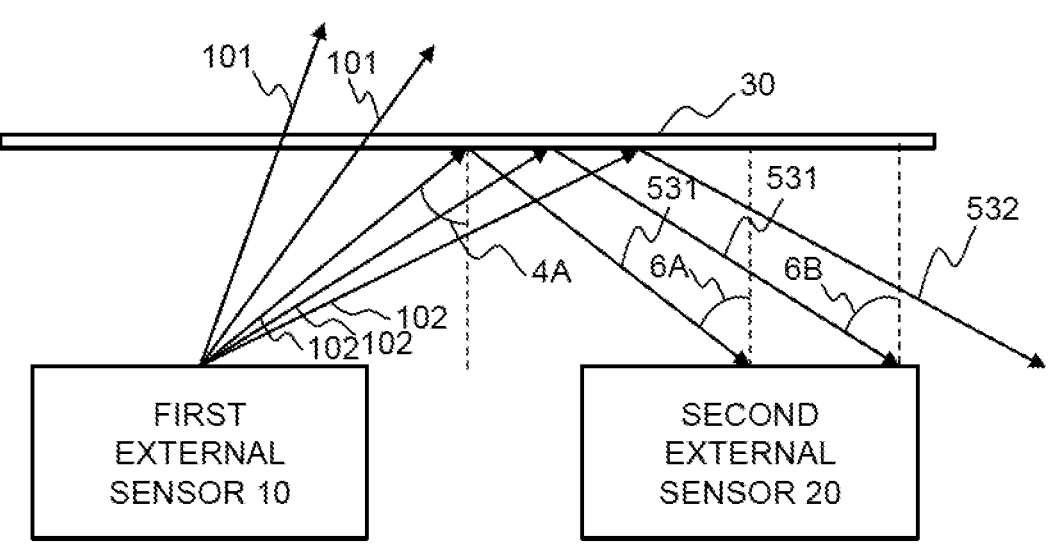
FIG. 7 is a diagram illustrating a method of removing an erroneously entered point group in a third embodiment.

FIG. 7 is a diagram illustrating a method of removing an erroneously entered point group in the third embodiment. It is a method of removing the point group erroneously entered from the first external sensor 10 among the point groups obtained by the second external sensor 20 by using the positional relationship of the first external sensor 10, the second external sensor 20, and the in-vehicle structural object 30.

In FIG. 7, since the exit wave 102 emitted from the first external sensor 10 and reflected by the in-vehicle structural object 30 is not shielded in the middle, some of the exit waves 102 are reflected by the in-vehicle structural object 30 and incident on the second external sensor 20. Therefore, among the exit waves 102 reflected by the in-vehicle structural object 30, those entering the second external sensor 20 are referred to as exit waves 531, and those not entering the second external sensor 20 are referred to as exit waves 532.

Since the incident angle of the exit wave 531 incident on the second external sensor 20 also has an angle width, the maximum incident angle is set to 6B and the minimum incident angle is set to 6A at the incident angle of the exit wave 531 to the second external sensor 20. Both the minimum incident angle 6A and the maximum incident angle 6B can be calculated based on the geometric arrangement of the first external sensor 10, the second external sensor 20, and the in-vehicle structural object 30 and the refractive index of the in-vehicle structural object 30.

In view of this, if the point group of larger than or equal to the minimum incident angle 6A and smaller than or equal to the maximum incident angle 6B is removed with respect to the point group acquired by the second external sensor 20, an unnecessary point group derived from the exit wave 102 emitted from the first external sensor 10 can be removed.

Next, software processing for removing a point group of larger than or equal to the minimum incident angle 6A and smaller than or equal to the maximum incident angle 6B from the point group obtained by the second external sensor 20 will be described.

Figure 8:
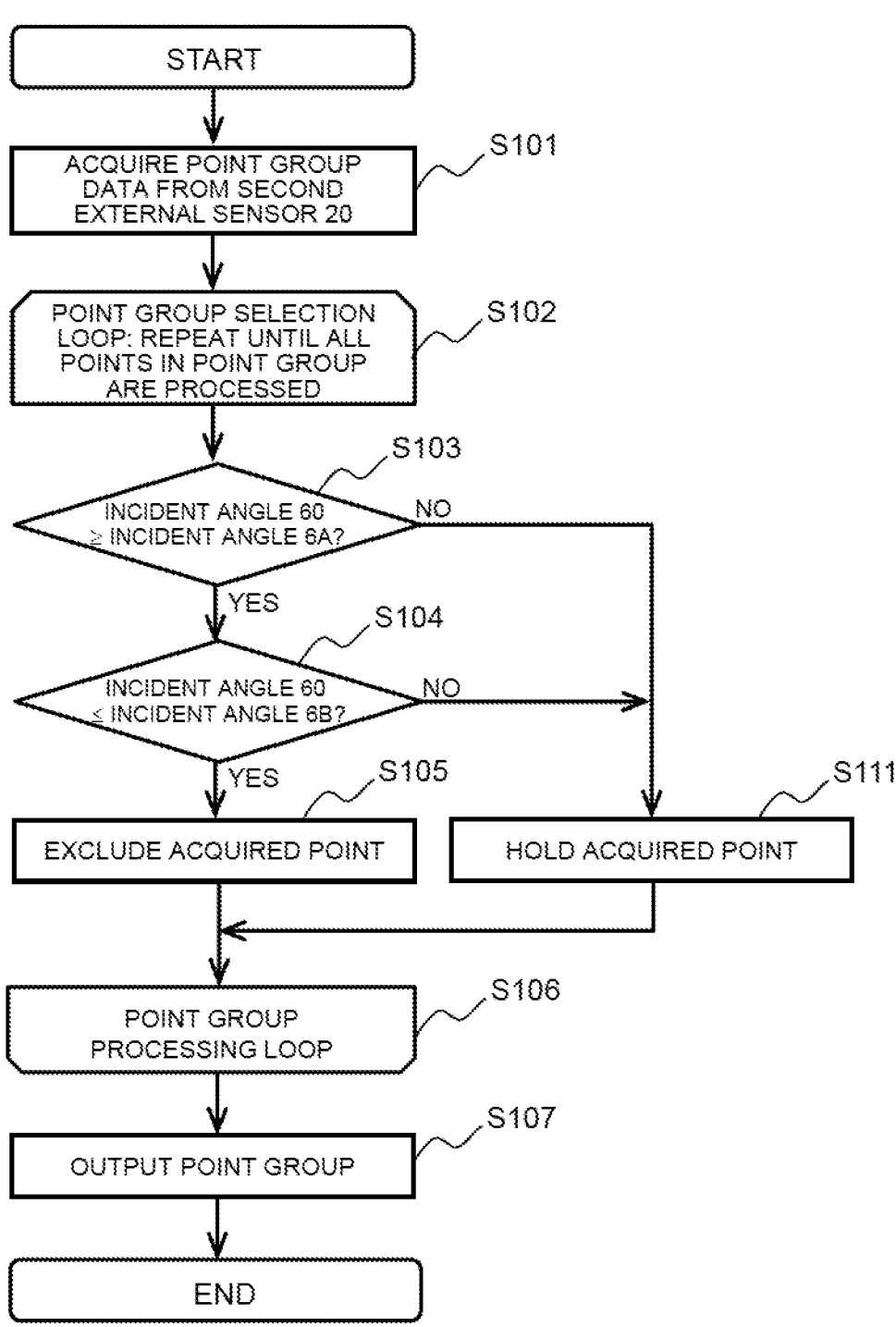
FIG. 8 is a diagram illustrating a flowchart for point group exclusion according to the third embodiment.

FIG. 8 is a diagram illustrating a flowchart for point group exclusion according to the third embodiment. An execution subject of each step constituting this flowchart is a processing device (not illustrated) included in the front monitoring system according to the present invention, but the description of the execution subject is omitted below.

In step 101 (S101), the point group data derived from the exit wave incident on the second external sensor 20 is acquired. The point group data includes a point group derived from the exit wave emitted by the second external sensor 20 itself and a point group derived from the exit wave emitted by the first external sensor 10, reflected by the in-vehicle structural object 30, and incident on the second external sensor 20.

Step 102 (S102) is a start step in performing the processing on each of all the acquired point groups.

When determined in step 103 (S103) that the incident angle 60 of the exit wave is larger than or equal to the minimum incident angle 6A for the point acquired from the point group to be processed (YES), the process proceeds to step 104 (S104). On the other hand, when determined that the incident angle 60 of the exit wave is smaller than the minimum incident angle 6A (NO), the process proceeds to step 111 (S111).

When determined in step 104 (S104) that the incident angle 60 of the exit wave satisfies the condition of smaller than or equal to the maximum incident angle 6B (YES), this point satisfies the incident angle 60 being larger than or equal to the minimum incident angle 6A and smaller than or equal to the maximum incident angle 6B, and thus the process proceeds to step 105 (S105). On the other hand, when determined that the incident angle 60 of the exit wave is greater than the maximum incident angle 6B (NO), the process proceeds to step 111 (S111).

In step 105 (S105), the acquired points are regarded as corresponding to the point group derived from the exit wave emitted by the first external sensor 10 and excluded.

In step 106 (S106), the process returns to step 102 (S102) to execute the point group processing loop until the processing on all the point groups is completed, and the process proceeds to step 107 (S107) after the point group processing loop is terminated.

In step 107 (S107), the remaining point groups excluding the point at which the incident angle 60 of the exit wave is larger than or equal to the minimum incident angle 6A and smaller than or equal to the maximum incident angle 6B are output as data of a point group necessary for monitoring.

In step 111 (S111), the acquired points are held as data of point group necessary for monitoring.

In addition, the processing flow from step 101 (S101) to step 111 (S111) is executed each time the second external sensor 20 acquires a point group.

As described above, in the third embodiment, if the positional relationship of the first external sensor 10, the second external sensor 20, and the in-vehicle structural object 30 and the refractive index of the in-vehicle structural object 30 are known, the point group derived from the exit wave reflected by the in-vehicle structural object 30 and incident on the second external sensor 20 can be removed by software. As a result, the erroneous detection in front monitoring performed in the post-stage processing can be reduced. In addition, by providing the upper limit value for the incident angle to be excluded, the point group can be prevented from being excluded more than necessary, and performance deterioration of front monitoring by the external sensor can be suppressed. Of course, the same applies to a case where the relationship between the emission and incidence of the first external sensor 10 and the second external sensor 20 is reversed.

Fourth Embodiment

A fourth embodiment is another example of a method of removing an exit wave emitted from the first external sensor 10 and reflected by the in-vehicle structural object 30 by software processing without physically shielding the exit wave with a plate or the like.

Figure 9:
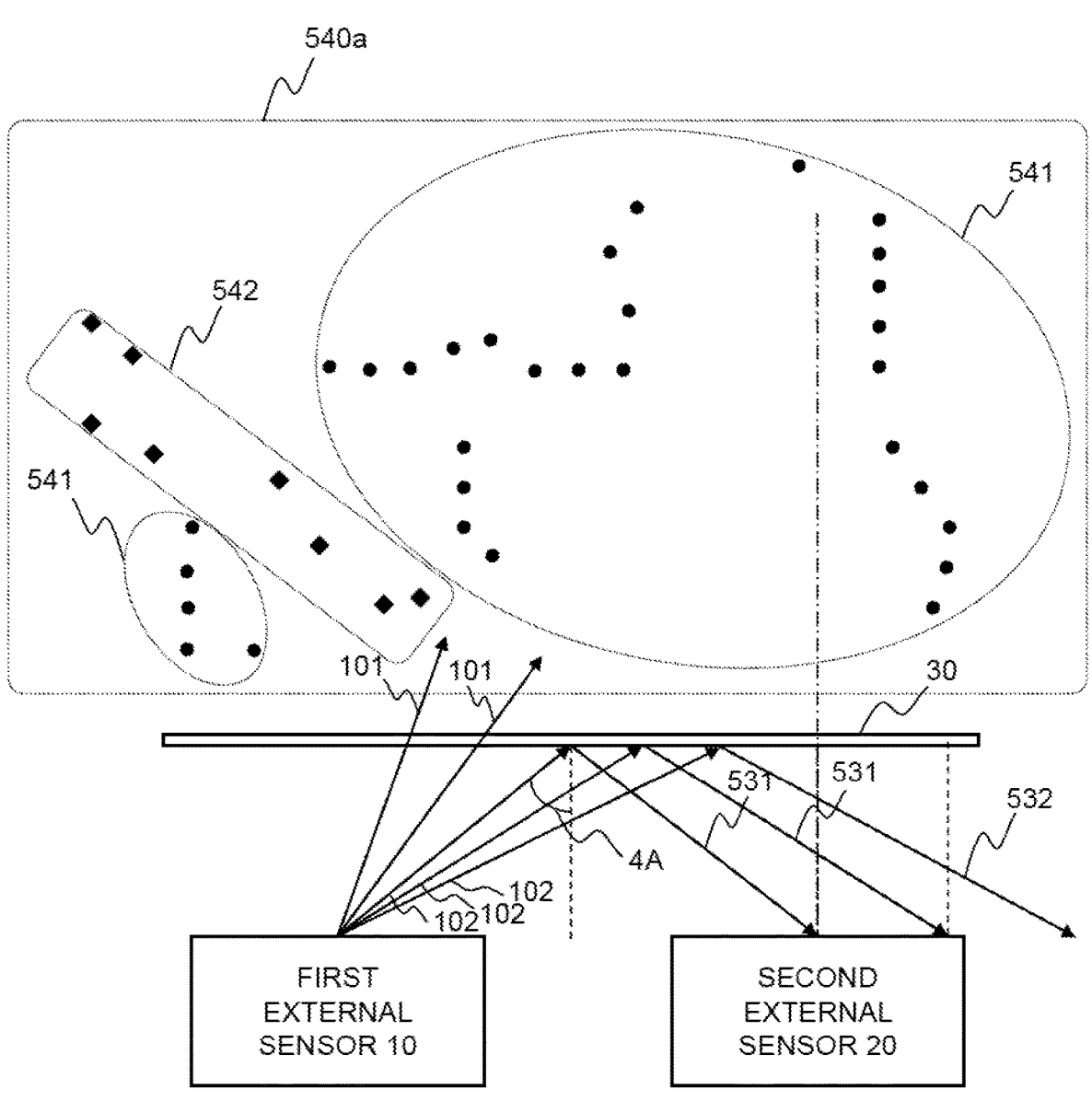
FIG. 9 is a diagram illustrating a point group acquired by a second external sensor in a fourth embodiment.

FIG. 9 is a diagram illustrating a point group acquired by the second external sensor in the fourth embodiment. A point group 540a acquired by the second external sensor 20 based on the exit wave that has entered the second external sensor 20 is illustrated. The point group 540a includes a point group 541 derived from an exit wave emitted from the second external sensor 20, normally reflected by an object in front of the vehicle, and entered to the second external sensor 20, and a point group 542 derived from an exit wave emitted from the first external sensor 10, reflected by the in-vehicle structural object 30, and entered to the second external sensor 20. Among them, the point group 542 is a point group that does not originally exist, and thus needs to be removed.

The fourth embodiment is a method of removing the point group 542 derived from the exit wave emitted by the first external sensor 10 by comparing the point group 540a (FIG. 9) acquired by the second external sensor 20 when the first external sensor 10 is emitting the exit wave and the point group 540b (FIG. 11) acquired by the second external sensor 20 when the first external sensor 10 is not emitting the exit wave to remove the point group 542.

Figure 10:
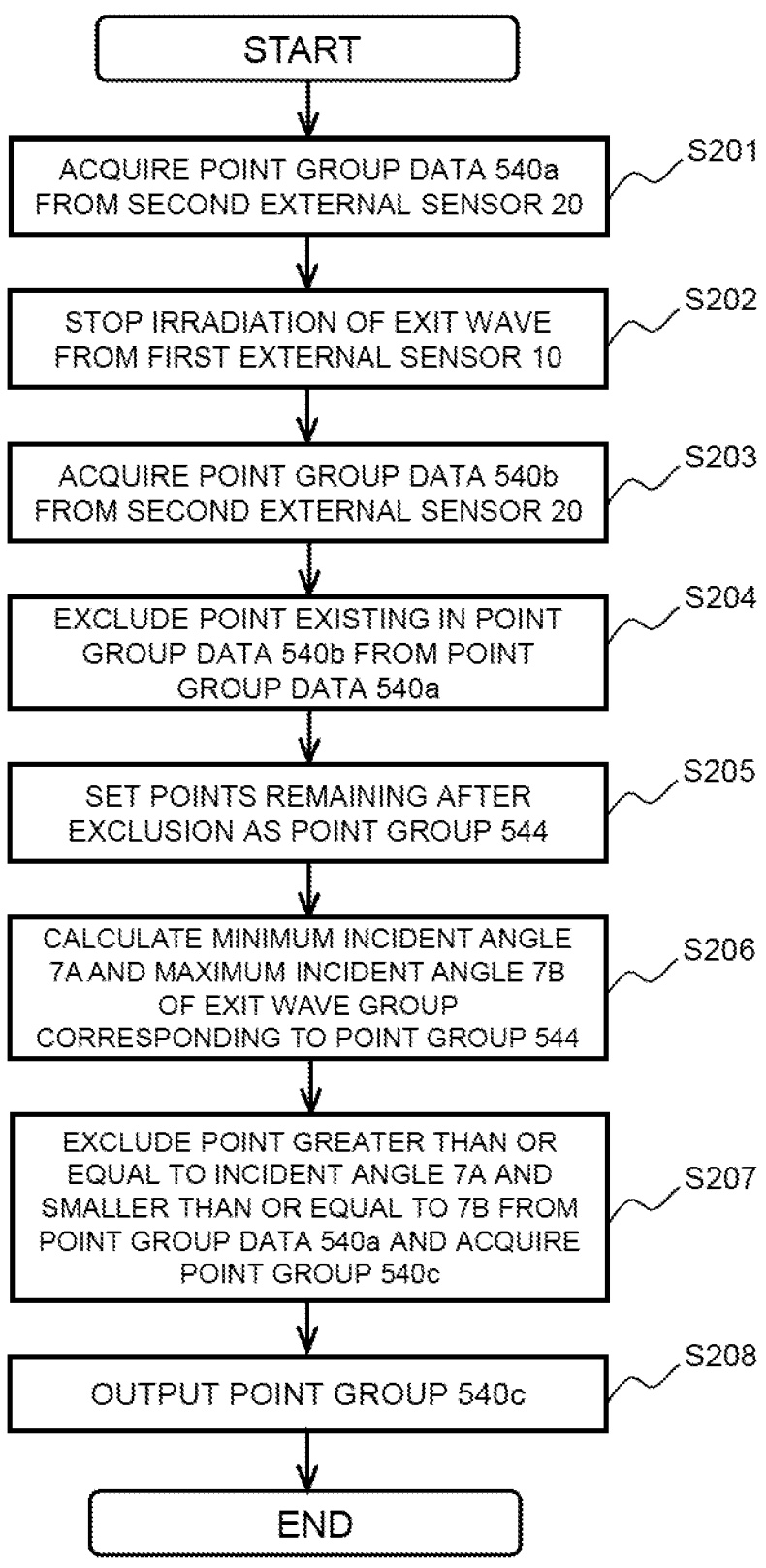
FIG. 10 is a diagram illustrating a flowchart for point group exclusion according to the fourth embodiment.

FIG. 10 is a diagram illustrating a flowchart for point group exclusion according to the fourth embodiment. An execution subject of each step constituting this flowchart is a processing device (not illustrated) included in the front monitoring system according to the present invention, but the description of the execution subject is omitted below.

In step 201 (S201), the point group data 540a is acquired from the second external sensor 20.

In step 202 (S202), the irradiation of the exit wave from the first external sensor 10 is stopped.

Figure 11:
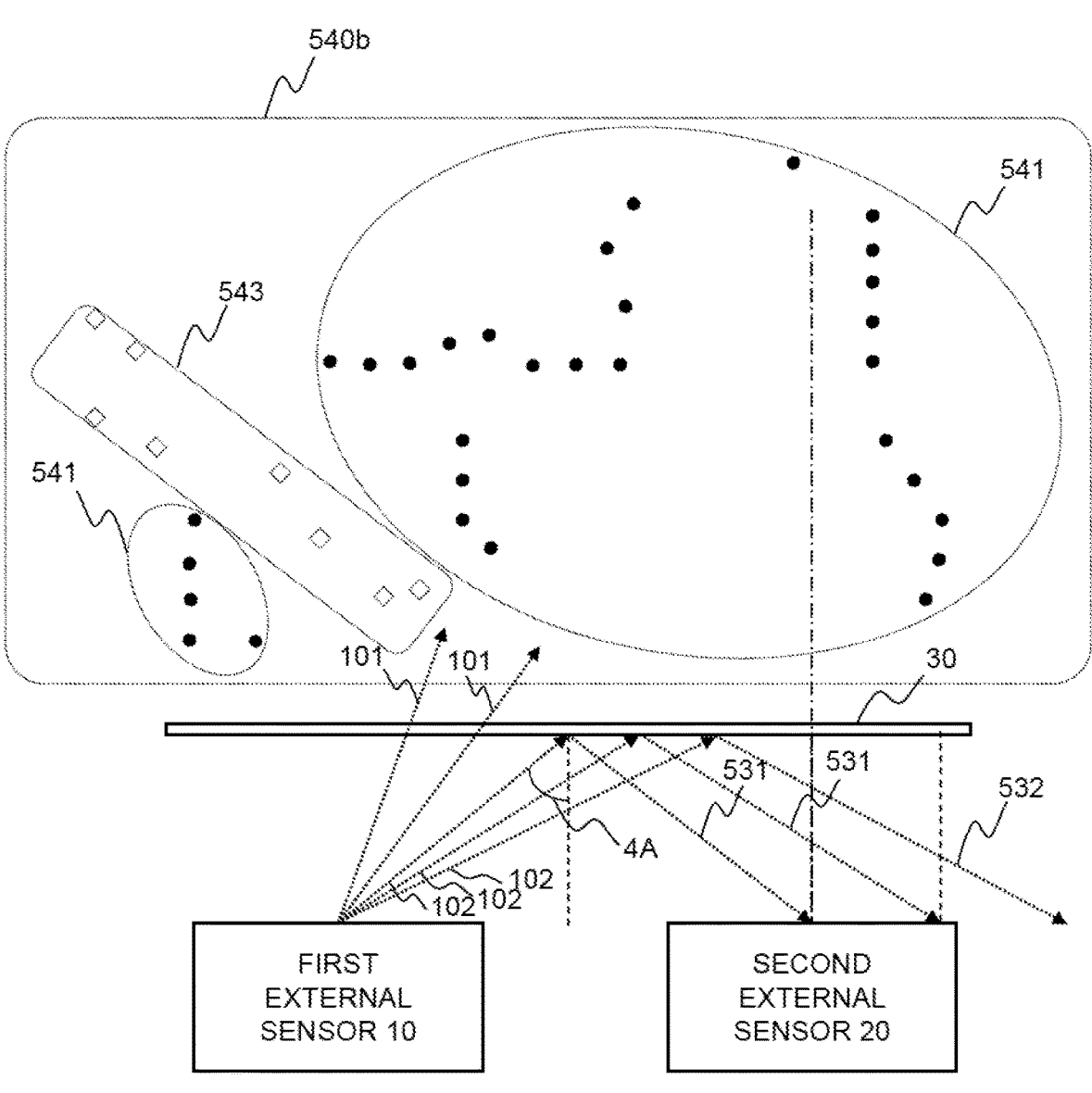
FIG. 11 is a diagram illustrating a point group acquired by the second external sensor when irradiation of the exit wave from the first external sensor is stopped.

In step 203 (S203), the point group data 540b is acquired from the second external sensor 20 in a state where the first external sensor 10 is not emitting the exit wave. Here, FIG. 11 is a diagram illustrating a point group 540b acquired by the second external sensor 20 when the irradiation of the exit wave from the first external sensor 10 is stopped. As illustrated in FIG. 11, the point group 543 derived from the exit wave emitted by the first external sensor 10 is not acquired, and only the point group 541 derived from the exit wave emitted by the second external sensor 20 is acquired.

Figure 12:
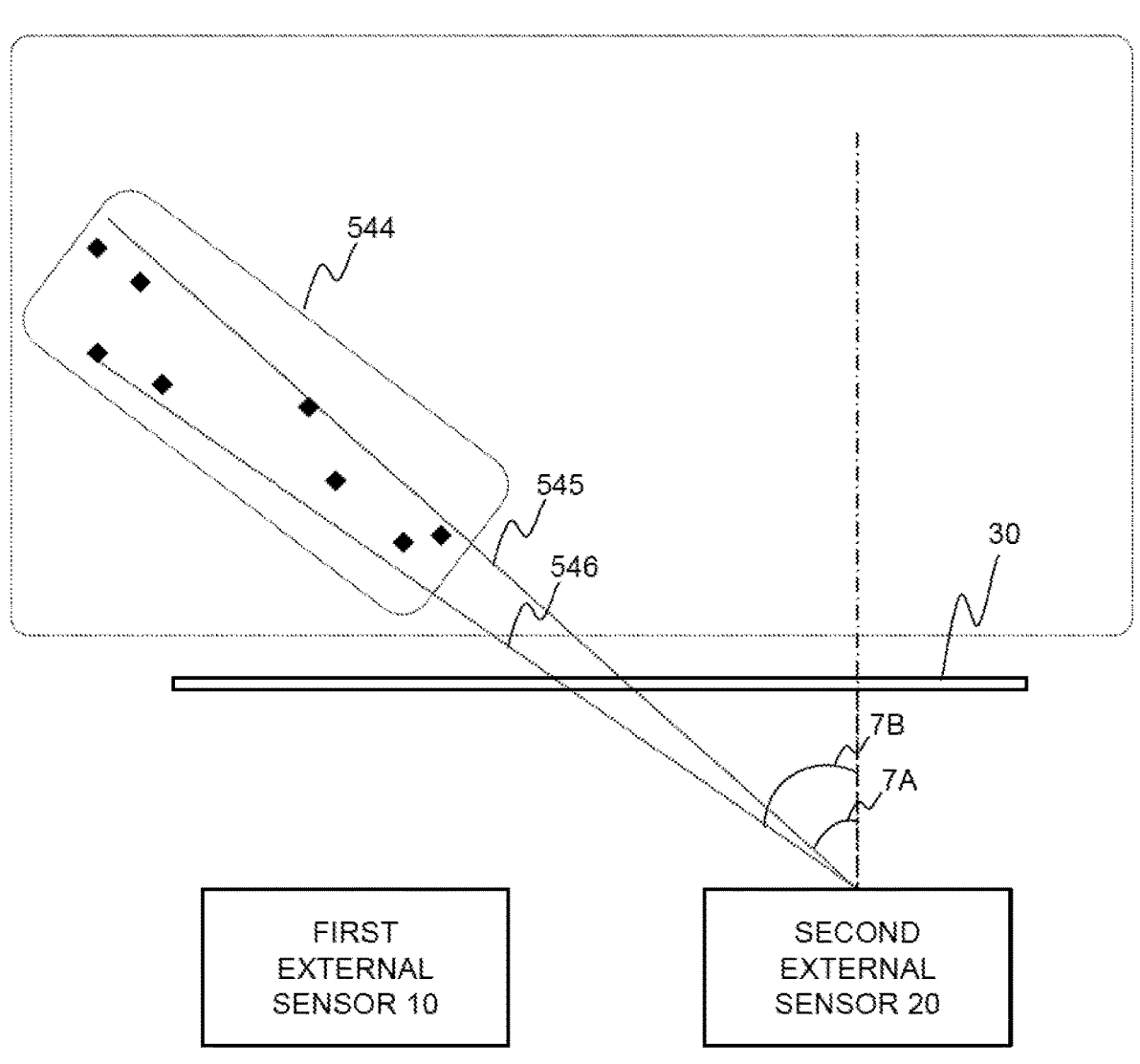
FIG. 12 is a diagram illustrating a state in which a point group received by the second external sensor remains by the exit wave from the first external sensor.

In step 204 (S204), points present in the point group data 540b are excluded from the point group data 540a. FIG. 12 is a diagram illustrating a state in which the point group received by the second external sensor 20 remains by the exit wave from the first external sensor 10 due to the exclusion. That is, only the point group 544 derived from the exit wave emitted by the first external sensor 10 can be extracted.

In step 205 (S205), the point group remaining after the exclusion in step 204 (S204) is set as the point group 544.

In step 206 (S206), the minimum incident angle 7A and the maximum incident angle 7B are calculated from the incident angle with respect to the second external sensor 20 for each of the exit waves corresponding to the point group 544.

Figure 13:
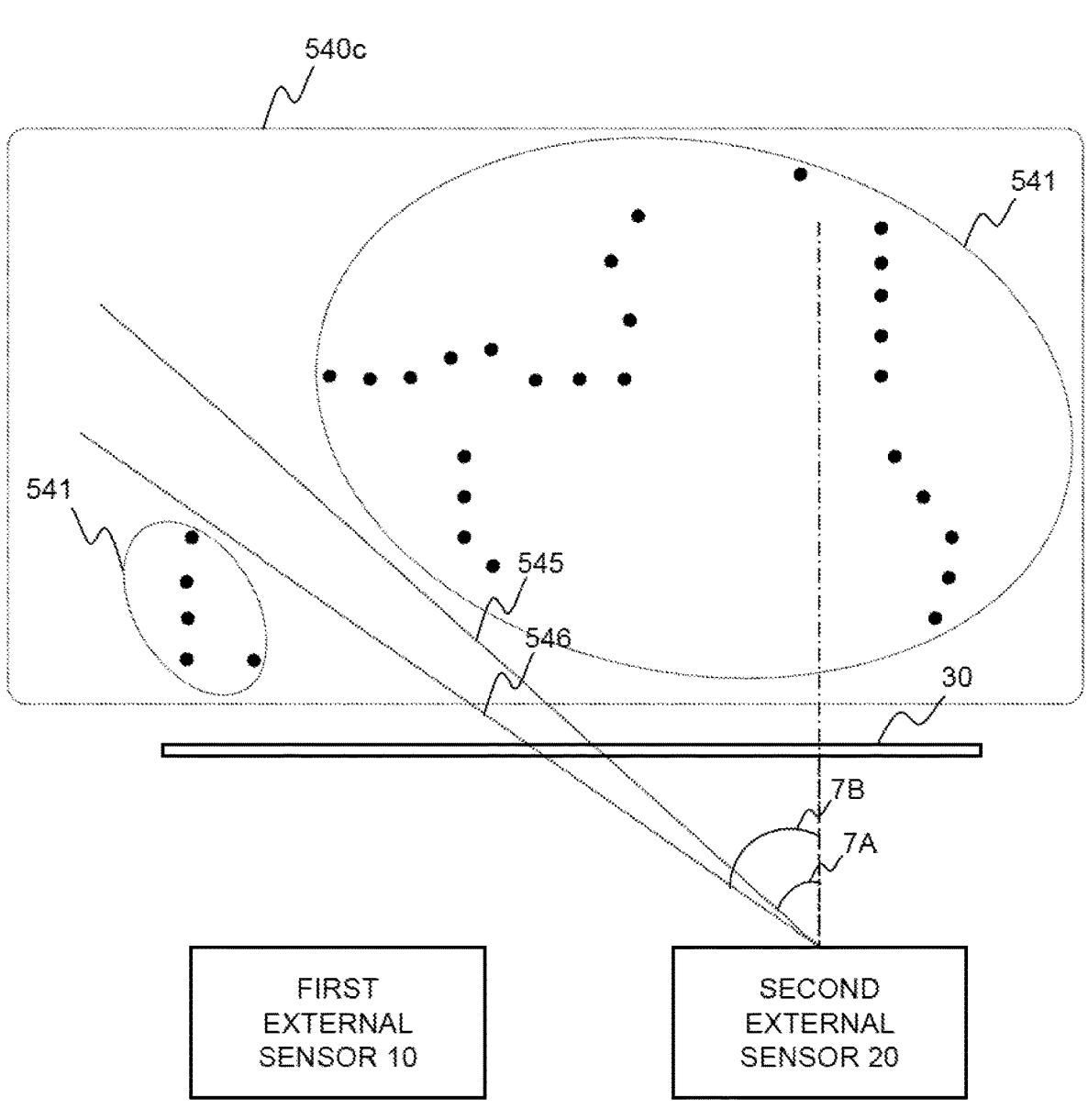
FIG. 13 is a diagram illustrating a point group excluding all point groups derived from an exit wave emitted by the first external sensor.

In step 207 (S207), the point group 540c is acquired by removing the point group 544 derived from the exit wave entering the second external sensor 20 at the incident angle of larger than or equal to the minimum incident angle 7A and smaller than or equal to the maximum incident angle 7B from the point group data 540a. FIG. 13 is a diagram illustrating the point group 540c acquired in this manner. Since all the point groups derived from the exit wave emitted by the first external sensor 10 are included in the exit wave entering the second external sensor 20 at larger than or equal to the minimum incident angle 7A and smaller than or equal to the maximum incident angle 7B, all the point groups derived from the exit wave emitted by the first external sensor 10 are excluded from the point group 540*c*.

Finally, in step 208 (S208), the point group 540*c* is output to, for example, a front monitoring algorithm or the like using an external sensor.

As described above, in the fourth embodiment, the point group derived from the exit wave emitted by the first external sensor 10 can be removed from the point group acquired by the second external sensor 20 without grasping the positional relationship the first external sensor 10, the second external sensor 20, the in-vehicle structural object 30, and the like in advance. Of course, the same applies to a case where the relationship between the emission and incidence of the first external sensor 10 and the second external sensor 20 is reversed.

Fifth Embodiment

In the fourth embodiment described above, when removing the point group derived from the exit wave emitted by the first external sensor 10 from the point group acquired by the second external sensor 20, the positional relationship of the first external sensor 10, the second external sensor 20, the in-vehicle structural object 30, and the like does not need to be grasped in advance.

Therefore, the method of the fourth embodiment can also be applied to a case where at least one of the first external sensor 10, the second external sensor 20, and the in-vehicle structural object 30 is mounted on a different vehicle, and the positional relationship of the first external sensor 10, the second external sensor 20, and the in-vehicle structural object 30 is unknown.

A fifth embodiment is an example in which the method of the fourth embodiment is applied to a case where each of the first external sensor 10, the second external sensor 20, and the in-vehicle structural object 30 are mounted on different vehicles.

Figure 14:
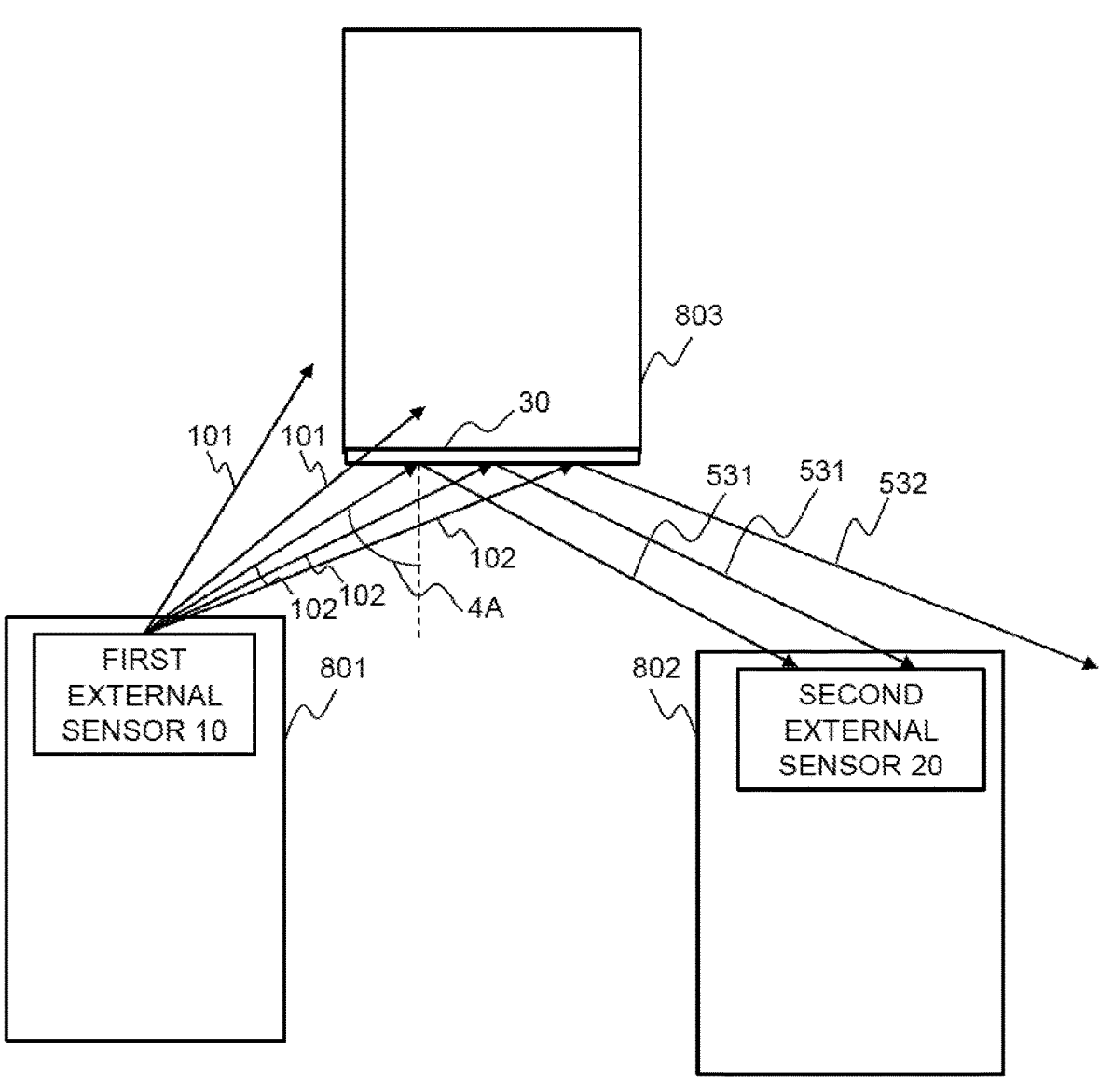
FIG. 14 is a diagram illustrating an example of arrangement in a case where all of the first external sensor, the second external sensor, and the in-vehicle structural object are mounted on different vehicles in a fifth embodiment.

FIG. 14 is a diagram illustrating an example of arrangement in a case where each of the first external sensor 10, the second external sensor 20, and the in-vehicle structural object 30 are mounted on different vehicles in the fifth embodiment.

As illustrated in FIG. 14, the first external sensor 10 is mounted on a vehicle 801, the second external sensor 20 is mounted on a vehicle 802 different from the vehicle 801, and the in-vehicle structural object 30 is mounted on a vehicle 803 different from the vehicle 801 and the vehicle 802. In addition, the vehicle 801 and the vehicle 803, and the vehicle 802 and the vehicle 803 face each other.

In this arrangement, the exit wave emitted by the first external sensor 10 is divided into an exit wave 102 reflected by the in-vehicle structural object 30 and an exit wave 101 not reflected by the in-vehicle structural object 30, and furthermore, the exit wave 102 is divided into an exit wave 531 entering the second external sensor 20 and an exit wave 532 not entering the second external sensor 20.

The above configuration is similar in arrangement to the fourth embodiment other than that the vehicle on which each of the first external sensor 10, the second external sensor 20, and the in-vehicle structural object 30 is mounted is different, and thus the method of the fourth embodiment described above can be used. Thus, the point group derived from the exit wave emitted by the first external sensor 10 can be removed from the point group acquired by the second external sensor 20.

Sixth Embodiment

The above fourth embodiment is a method of comparing a case where the first external sensor 10 is emitting the exit wave and a case where the first external sensor 10 is not emitting the exit wave to extract the point group 544 (FIG. 12) derived from the first external sensor 10, and calculate the minimum incident angle 7A and the maximum incident angle 7B.

A sixth embodiment is a method of calculating a direction of entering the second external sensor 20 as an excluding direction from an exit wave corresponding to each point constituting the point group 544, and removing the point group corresponding to the excluding direction from the point group acquired by the second external sensor 20.

As a result, the point group derived from the exit wave emitted by the first external sensor 10 can be removed from the point group acquired by the second external sensor 20. Of course, the same applies to a case where the relationship between the emission and incidence of the first external sensor 10 and the second external sensor 20 is reversed.

Seventh Embodiment

The methods of the first to sixth embodiments described above are embodiments in which the application target is specified as a vehicle.

A seventh embodiment is a mode in which the methods of the first to sixth embodiments described above are applied not only to vehicles but also to ground facilities for traffic route peripheral monitoring arranged along a railroad, a road, or the like.

Specifically, if the vehicle is replaced with the ground facility and the in-vehicle structural object 30 is replaced with an in-ground facility structural object in each of the above embodiments, the methods of the first to sixth embodiments can be applied to the ground facility. In the seventh embodiment, the in-ground: structural object is a structural object that is installed in the ground facility and reflects an exit wave emitted by the first external sensor 10, and corresponds to, for example, glass installed to protect the first external sensor 10 from rain and wind.

REFERENCE SIGNS LIST

1 front monitoring system
10 first external sensor
20 second external sensor
30 in-vehicle structural object
4A predetermined angle
50 means for blocking exit wave of first external sensor reflected by in-vehicle structural object
51 plate (first embodiment)
52 plate (second embodiment)
6A minimum incident angle (third embodiment)
6B maximum incident angle (third embodiment)
7A minimum incident angle (fourth embodiment)
7B maximum incident angle (fourth embodiment)
101, 102, 201, 202, 531, 532 exit wave
103, 203 reflected wave
105 horizontal viewing angle (FoV)
106 vertical viewing angle (FoV)
107 to 109, 207 center line
110H, 210H reflection point
301 horizontal plane
512 to 515 dimension of plate
516, 521, 522 distance 517 A-A cross-sectional view
518 B-B cross-sectional view
540 to 544 point group
801 to 803 vehicle

The invention claimed is:

1. A front monitoring system comprising:
an external sensor that is mounted inside a vehicle, emits an exit wave toward a front of the vehicle, and acquires a reflected wave entering the external sensor as a detection signal; and
a removing means that removes the exit wave emitted by the external sensor and incident on a structural object installed inside the vehicle in a specific direction,
wherein the removing means removes the exit wave emitted by the external sensor and entering the structural object at an incident angle larger than a predetermined angle,
wherein the external sensor includes a first external sensor and a second external sensor, and
the external sensor that emits the exit wave to be removed by the removing means is the first external sensor or the second external sensor, and
wherein the removing means is configured by software executed by a processing device included in the front monitoring system, and the software causes the processing device to execute:
    a first step of acquiring the detection signal from the first or second external sensor that has emitted the exit wave; and
    a second step of excluding, from the detection signal acquired in the first step, the detection signal incident on the second or first external sensor at larger than or equal to a minimum incident angle that is a minimum value of an incident angle when the exit wave is reflected by the structural object and is incident on the second or first external sensor, and holding the detection signal incident on the second or first external sensor at an angle smaller than the minimum incident angle, and
wherein the incident angle is an angle formed by the incident direction and a normal line of a boundary surface.

2. The front monitoring system according to claim 1, wherein the minimum incident angle is calculated based on at least geometric arrangement of the first external sensor, the second external sensor, and the structural object.

3. The front monitoring system according to claim 1, wherein the software causes the processing device to execute a third step of excluding, from the detection signal excluded in the second step, the detection signal incident on the second or first external sensor at smaller than or equal to a maximum incident angle that is a maximum value of the incident angle when the exit wave is reflected by the structural object and is incident on the second or first external sensor, as it is, and holding the detection signal incident on the second or first external sensor at an incident angle larger than the maximum incident angle.

4. The front monitoring system according to claim 3, wherein the maximum incident angle is calculated based on at least geometric arrangement of the first external sensor, the second external sensor, and the structural object.

5. The front monitoring system according to claim 1, wherein the software causes the processing device to execute:
    a third step of acquiring a first detection signal from the second or first external sensor in a case where the first or second external sensor is emitting the exit wave;
    a fourth step of acquiring a second detection signal from the second or first external sensor in a case where the first or second external sensor is not emitting the exit wave;
    a fifth step of calculating a third detection signal by excluding the second detection signal from the first detection signal;
    a sixth step of calculating, from the third detection signal, a minimum incident angle that is a minimum value of an incident angle of the exit wave incident on the second or first external sensor, and a maximum incident angle that is a maximum value of an incident angle of the exit wave incident on the second or first external sensor; and
    a seventh step of excluding, from the first detection signal, the first detection signal incident on the second or first external sensor at an incident angle of larger than or equal to the minimum incident angle and smaller than or equal to the maximum incident angle, and outputting the first detection signal.

6. The front monitoring system according to claim 1, wherein the software causes the processing device to execute:
    a third step of acquiring a first detection signal from the second or first external sensor in a case where the first or second external sensor is emitting the exit wave;
    a fourth step of acquiring a second detection signal from the second or first external sensor in a case where the first or second external sensor is not emitting the exit wave;
    a fifth step of calculating a third detection signal by excluding the second detection signal from the first detection signal;
    a sixth step of calculating a direction in which the exit wave corresponding to the third detection signal is incident on the second or first external sensor as an excluding direction; and
    a seventh step of excluding the first detection signal entering from the excluding direction from the first detection signal and outputting the first detection signal.

7. The front monitoring system according to claim 2, wherein the software causes the processing device to execute a third step of excluding, from the detection signal excluded in the second step, the detection signal incident on the second or first external sensor at smaller than or equal to a maximum incident angle that is a maximum value of an incident angle when the exit wave is reflected by the structural object and is incident on the second or first external sensor, as it is, and holding the detection signal incident on the second or first external sensor at an incident angle larger than the maximum incident angle.

8. The front monitoring system according to claim 7, wherein the maximum incident angle is calculated based on at least geometric arrangement of the first external sensor, the second external sensor, and the structural object.

\* \* \* \* \*